United States Patent [19]

Adler et al.

[11] Patent Number: 5,071,297
[45] Date of Patent: Dec. 10, 1991

[54] METHOD AND COPYING MEANS FOR THE DIGITAL CONTROL OF A MACHINE TOOL

[76] Inventors: Joachim Adler, Ramsenstrasse 24, St. Gallen; Max Gahler, Wiggenrainstr. 18b, Rorschacherberg; Klaus Reithofer, Erlenstrasse 11a, Rorschacherberg, all of Switzerland

[21] Appl. No.: 255,360

[22] Filed: Oct. 11, 1988

Related U.S. Application Data

[63] Continuation-in-part of Ser. No. 906,422, Sep. 11, 1986, abandoned.

[30] Foreign Application Priority Data

Sep. 12, 1985 [CH] Switzerland .................. 3958/85

[51] Int. Cl.⁵ .................. B23Q 35/04; G05B 19/18
[52] U.S. Cl. .................. 409/84; 318/578; 364/474.03; 404/127
[58] Field of Search .................. 409/84, 127, 128, 129, 409/126; 364/474.03; 318/578

[56] References Cited

U.S. PATENT DOCUMENTS

| | | | |
|---|---|---|---|
| 2,433,005 | 12/1947 | Turchan, et al. | 409/129 |
| 2,837,707 | 6/1958 | Stokes | 409/127 X |
| 3,697,040 | 10/1972 | Weaver | 409/127 X |
| 3,707,662 | 12/1972 | Hottman | 318/578 |
| 4,084,244 | 4/1978 | Flöter | 364/474.03 |
| 4,412,295 | 10/1983 | Imazeki et al. | 318/578 X |
| 4,630,215 | 12/1986 | Graham, Jr. | 364/474.03 |
| 4,646,225 | 2/1987 | Matsuura | 318/578 X |
| 4,679,159 | 7/1987 | Yamazaki et al. | 364/474.03 |

OTHER PUBLICATIONS

*Makino Accutrace System* Catalog, Makino Milling Machine Co. Ltd., Tokyo Japan 6-1978.
*Koehring Pegasus Micro Path 2 System* Catalog, Koehring, Pegasus Division Troy Mich. 2-1981.

*Primary Examiner*—Z. R. Bilinsky

[57] ABSTRACT

A tracer head for a copy milling machine which is digitally controlled and causes a model to be scanned by a stylus mechanically mounted in the tracer head. The stylus is deflected both at right angles and tangentially to the surface of the model when the stylus contacts the model to produce scanning signals which are proportional to the deflections at right angles to the model surface and the deflections tangential to the model surface. These signals then are transmitted to a processor which processes, amplifies and subsequently feeds the processed and amplified scanning signals to servomotors of the machine to cut and shape a workpiece in such manner as to produce a copy of the model. The amount of spring pressure exerted on the stylus inside the head by the mechanical spring mounting when the stylus contacts the model is determined by establishing the pressure separately along each of the three mutually orthogonal x, y and z axes.

6 Claims, 3 Drawing Sheets

METHOD AND COPYING MEANS FOR THE DIGITAL CONTROL OF A MACHINE TOOL

CROSS-REFERENCE TO A RELATED APPLICATION

This application is a continuation-in-part of application Ser. No. 906,422 filed Sept. 11, 1986 and now abandoned.

BACKGROUND OF THE INVENTION

It has long been known to use copy milling machines for cutting and shaping workpieces having complicated three-dimensional shapes. To this end, a model is mechanically scanned by means of a scanner or tracer head equipped with a stylus. During this scanning, the stylus is deflected. Signals corresponding to the size of the deflection are generated. A copy regulating means responds to these signals to generate feed signals for controlling the servodrives of the copy milling machine whereby the workpieces are cut and shaped.

Whereas previously analog contouring controls were used exclusively, digital contouring controls have come into wider use because digital controls can be used to reduce the relatively long machining times occurring during copy milling, thus producing a corresponding rise in productivity for such machines. This rise results from higher feed rates. However, additional problems arise when higher feed rates are used. It is very important that greater nominal deflections can be obtained with the stylus used. This permits larger lag distances avoiding an otherwise excessive control gain.

The aforementioned problems are well known, being described in the publications by S. Schreiber and U. Bruggemann "Design of a copying tracer head with large deflection range" and by R. Wollenberg, and R. Milnikel "Improvement of the dynamic response of copying heads with the aid of a microcomputer" in the Journal "Industrieanzeiger", No. 58 of 19.7.85.

SUMMARY OF THE INVENTION

It is an object of the present invention to provide a new method of digitally controlling a copy milling machine and a new tracer head wherein the geometrical accuracy of the workpiece with respect to the model is improved while allowing higher feed rates to be used.

Another object of the invention is to reduce the differences between the model and the workpiece that are caused by loading or stressing of the milling cutter.

Still another object is to improve the geometrical accuracy of the workpiece with respect to the model by deflecting the stylus in a servocontrolled manner tangentially, in the scanning head movement direction, by a predetermined amount with respect to its centered position as well as deflecting the stylus in a controlled manner at right angles to the surface of the model by another predetermined amount with respect to the centered position.

A further object of this invention is to provide a new copying device wherein the tracer head is provided with means for differing adjustments of the nominal value for the stylus deflection as well as means for adjusting the contact pressure with which the stylus presses on the model.

In accordance with the principles of the invention, a method is provided for digitally controlling a copy milling machine wherein a model is scanned by a stylus mechanically mounted in a tracer head, the stylus being deflected both at right angles and tangentially to the surface of the model when the stylus contacts the model. Scanning signals which are proportional to the deflections at right angles to the model surface and the deflections tangential to the model surface are produced. These signals are then transmitted to a processor which processes, amplifies and subsequently feeds the processed and amplified scanning signals to servomotors of the machine to cut and shape a workpiece in such manner as to produce a copy of the model. The method includes the steps of establishing the amount of spring pressure exerted on the stylus inside the tracer head by the mechanical mounting when the stylus contacts the model. The amount of pressure is established separately along each of the three mutually orthogonal x, y and z axes.

The stylus initially is positioned within the tracer head at a central zero position along each of the three axes. The method can include the additional step of repositioning the stylus to a preselected non zero position along each of the axes, the position along each of the axes being selected individually.

In accordance with the principles of the invention, a tracer head for a tool of a machine comprises a bearing body, a stylus secured within the body; and first, second and third contact pressure adjusting means, each of these means exerting an individually preset pressure along a different corresponding one of the three mutually orthogonal x, y and z axes.

The stylus has an initial central zero position along each of said three axes. The machine can also include first, second and third deflection determining means, each of these deflection determining means establishing an individual non zero deflection position of the stylus along a different corresponding one of the three axes.

The aforementioned objects and advantages of the invention as well as other objects and advantages thereof will either be explained or will become apparent to those skilled in the art when this specification is read in conjunction with the accompanying drawings and specific description of preferred embodiments which follow.

DETAILED DESCRIPTION OF THE PREFERRED EMBODIMENT

Figure 1:
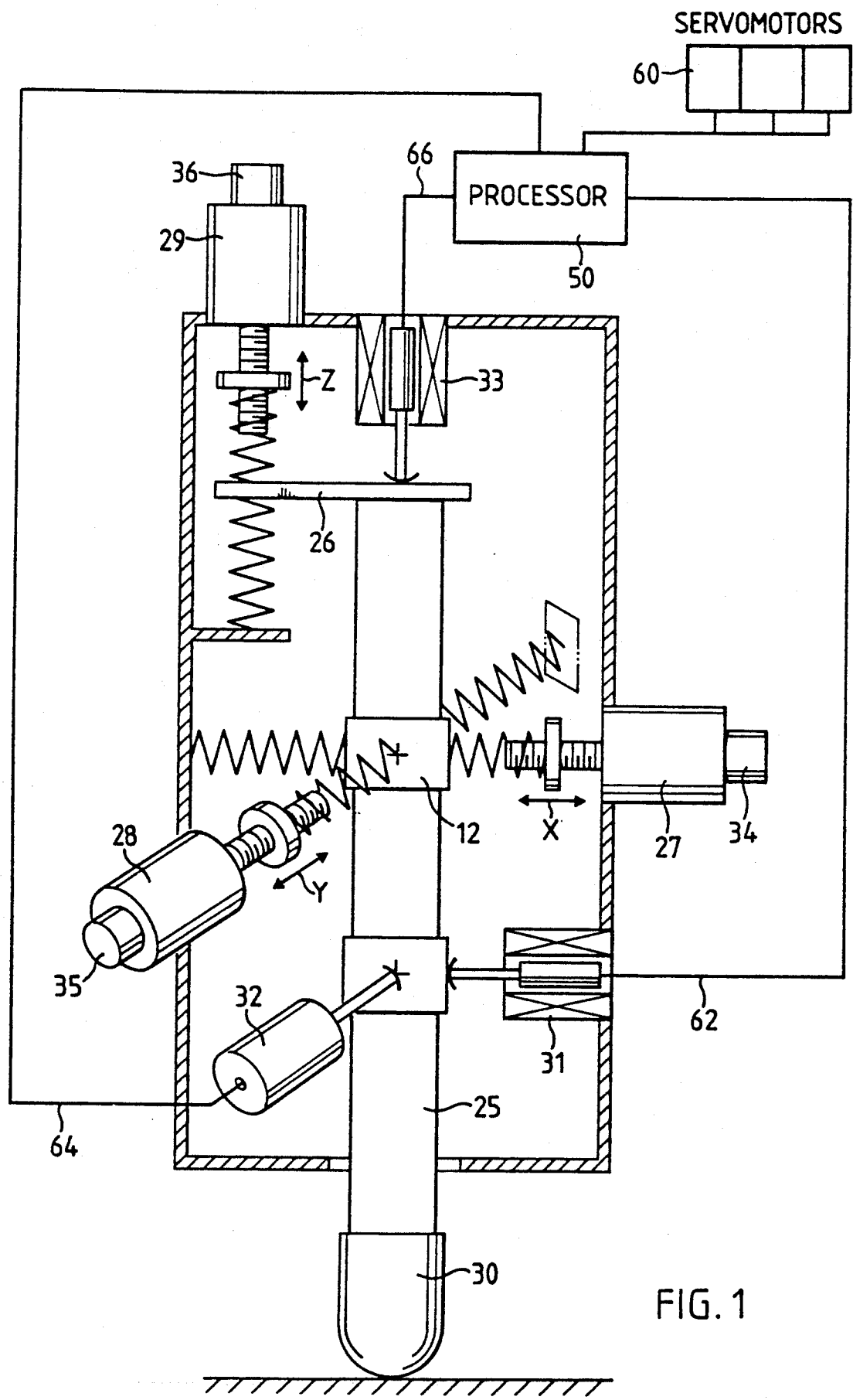
FIG. 1 is a schematic view of the tracer head with a stylus positioned tangentially to the direction of motion.

In known digital contouring controls of the type used in copy milling machines, the nominal value of the stylus deflection is fixed as a constant value and is then maintained for all feed movements. Such fixed setting of a constant nominal value for the stylus deflection can lead to usable copying precision in normal cases. However, this fixed setting is not of an optimum nature in many machining operations. In the case of milling work, it is not possible to avoid reactions on the milling cutter due to cutting on the surface of the workpiece, and this can lead to an elastic displacement of the cutter out of its nominal position. This is particularly the case when thin, cylindrical and conical milling tools are used, because such reactions can draw the tool over and beyond the theoretical amount into the workpiece. The invention provides a digital copying means with an adjustable nominal deflection value. It is therefore possible at critical points of the workpiece, i.e. at points where reactions exerted on the milling cutter could otherwise lead to the drawing in of the same, to reduce the nominal value for the stylus deflection, in order to avoid creation of undersizes on the workpiece.

Similar conditions exist in the case of workpiece parts the contours of which are virtually parallel to the copying feed direction and therefore receive a rough surface appearance. It is advantageous in this case, too, to mill with a smaller nominal stylus deflection value. Thus, the workpiece is produced oversize in these parts, and a clean surface can be obtained in a second machining operation in a feed direction at right angles thereto.

The aforementioned influencing of the milling work by changing the nominal stylus deflection value represents an "individual" adaptation of a contouring control to the particular machining operations, i.e. it is aligned with the workpiece. This adaptation can be further extended. As the stylus deflection is measured along the three axes of the machine tool, it is advantageous to preselect the nominal stylus deflection value in these directions, i.e. radially and axially, in a separate and different manner. As a result of this adjustment, a further "individual" adaptation of the stylus deflection to the workpiece contour can be obtained, as well as a separate correction of the stylus deflection in the radial and axial directions, that is to correct tool deflections due to cutting during the stylus deflection.

The "individual" adaptation of the stylus deflection to the particular milling work can also be extended in such a way that the feed rate is varied as a function of the movement direction and of the rotation direction of the machining tool, that is, continuous milling or climb milling. In contradistinction to known systems which operate with a constant feed rate over the model contour or in which the speed is regulated as a function of the milling force or milling power, the advantage of the invention exists here that the feed rate as a function of the type of milling, i.e., conventional milling or climb milling, as well as an introduction into or removal from the workpiece, can be individually adapted to the milling conditions so that a further productivity increase can be obtained.

The above statements are based on the assumption that the stylus deflection is at right angles to the model surface. As a result of frictional influences between stylus and model surface and in the stylus mounting support, this assumption only applies in an approximate manner. This phenomenon can be counteracted in that although the scanner is deflected substantially at right angles to the model surface, it is additionally servocontrolled in a movement direction tangential to the model surface by adjusting elements by a small amount with respect to its centered position, i.e. its zero point. This servocontrol is also able to avoid the copying errors at discontinuous model transitions, e.g. at flat inside corners, such as occur at high milling speeds in the case of known copying machines.

Referring now to the drawings in detail, FIG. 1 shows the tracer head with the stylus adjustable tangentially in the direction of motion relative to the surface of the model designated at 58.

Central stylus tube 25 carrying stylus 30 is guided mechanically parallel (not shown) in the directions X, Y, Z and resiliently centered at a support body 12 (for X and Y directions) and at carrier 26 for Z direction. By setting mechanisms 27, 28, 29 of any suitable conventional type the stylus tube 25 with the stylus 30 can be displaced in every nominal direction of motion compared to the zero point.

The deflections of stylus tube 25 vertically to the model surface as well as in the direction of motion, are measured separately for each axis by displacement measurement elements 31, 32, 33 of any suitable conventional type and used via the tracer control for the adjustment of the axes of the machine tool and for the control of direction of the servo control.

Displacement measurement elements or devices 31, 32, 33 are connected by connection lines 62, 64, 66 to a processor 50 known per se. The latter is connected, also in the known fashion to servomotors 60 of the copy milling machine. The stylus is suspended in all directions in a uniformly resilient manner.

Figure 2A:
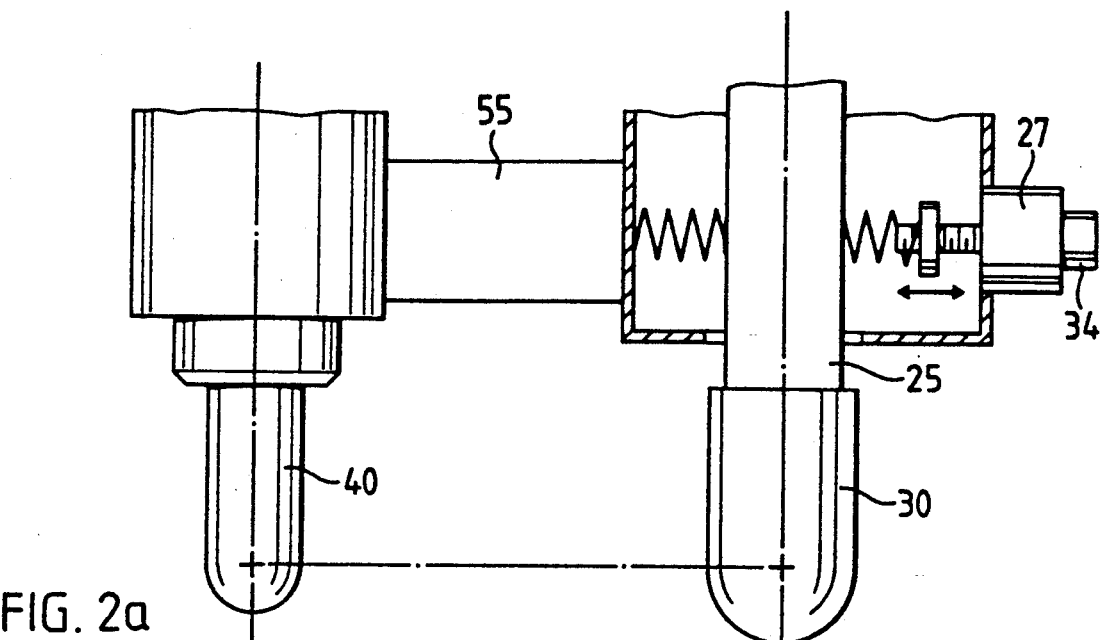
FIGS. 2a, 2b and 2c show positions of the milling tool and the stylus of the tracer head at different phases according to the method of the invention.
Figure 2B:
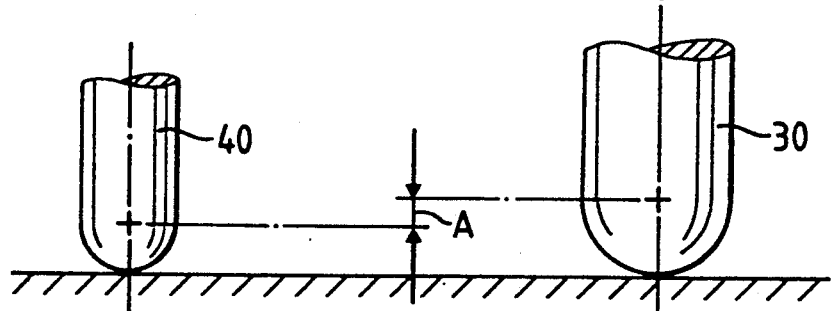
Figure 2C:
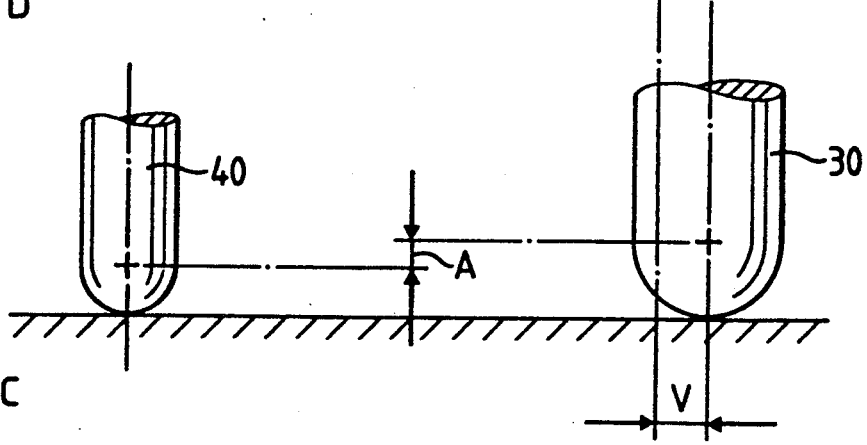

The relations between a milling tool 40 and the stylus 30 at different phases are shown in FIGS. 2a, 2b, 2c, wherein 2a shows a starting position, e.g. standstill without contact with the model. Reference numeral 55 designates a link connection between the tool and the stylus. Central point of tool 40 and stylus 30 are at identical positions compared with tool and model. Stylus 30 is enlarged by the amount of the nominal deflection A vertically to the model surface compared with the milling tool. FIG. 2b shows the standstill position with contact with the model. Stylus 30 is deflected by the nominal deflection A. FIG. 2c illustrates the motion to the right. Stylus 30 is deflected vertically by the nominal deflection A and additionally deflected by the desired forward drive amount V to its zero position.

The adaptation of the feed rate to the milling conditions can also be supplemented in that input points are provided for each machine axis on the control panel of the contouring control (conventional and not shown), with which it is possible to associate, with the programmed feed paths at selectable positions, further functions, e.g., the reversing and/or initiating of an infeed movement at right angles to the copying path, or a feed stop or a program end.

Moreover the milling cutter paths in the case of line-by-line copying can be automatically fixed in such a way that, without interrupting the milling process, working always takes place with the same milling cutter action, that is, always with conventional milling or always with climb milling.

Figure 3:
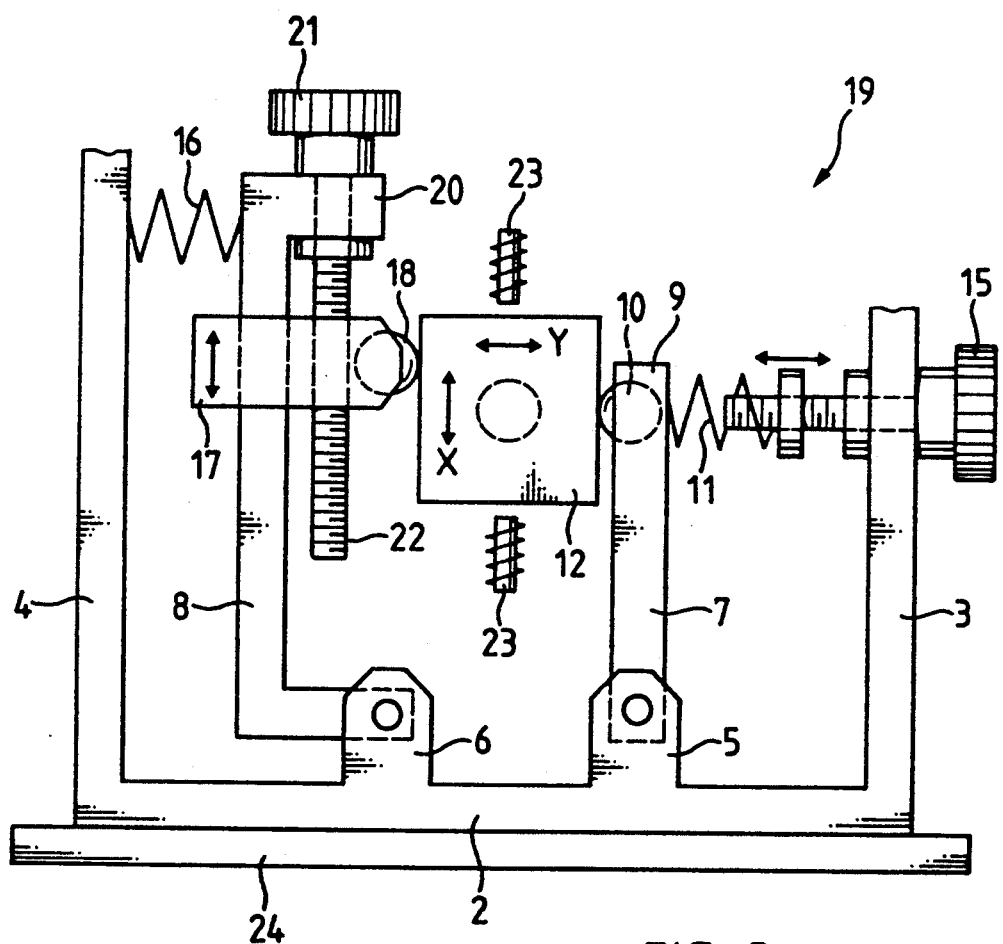
FIG. 3 is a schematic view of the device for the adjustment of a setting force acting on the tracer head.

The above statements show the significance of the stylus for a contouring control. In known contouring controls, the stylus is centered by means of springs and by using such springs there must be established an adequate contact pressure for stable stylus operation. However, if as in known contouring controls, the stylus springs have a fixed setting in the three deflection directions, in the case of major deflections there is a correspondingly high scanning pressure, which further increases model wear. To avoid this disadvantage, in the present contouring control, use is made of the tracer head, in which the stylus spring rigidity is adjustable as shown in FIG. 3. FIG. 3 is a plan view of the stylus with an adjustable spring characteristic in the Y-axis, while that in the X-axis is located in an underlying plane (not shown). The adjustment means has a frame 19 supported on a support 24 and comprising a web 2 and legs 3, 4. On web 2 are provided two bearing bases 5, 6 in which two rocking levers 7, 8 are mounted free to rotate. At the free end of rocking lever 7 is mounted a ball 10 which is pressed by a spring 11 against the bearing body 12, in the center of which is mounted the stylus (shown in dotted line). The tension of spring 11 can be adjusted by rotary grip 15. The control elements provided for the additional deflection can be electromagnets 23 (only represented for the x-axis) or a spindle drive, whose spindle acts via a spring on the stylus or the bearing body 12. Between leg 4 and rocking lever 8 is provided a spring 16, which presses on the rocking lever 8 and via a slide 17 by means of a ball 18 on bearing body 12. The zero point setting can be carried out with the aid of the rotary grip 15.

Rocking lever 8 is provided at its free end with an offset leg 20, in which is mounted a rotary grip 21 with a threaded spindle 22. On the latter is guided the slide 17 which can be displaced with respect to the stylus by rotating rotary grip 21. With the aid of rotary grips 15, 21, the spring characteristic can be adapted to the particular application, while grip 15 can be additionally used for mechanical zero point setting. The same adjusting mechanism is used for stylus displacement in the x-direction.

The adjustment of the spring characteristic in the Z-axis takes place in the same way as for the X and Y-directions, with the sole difference that the frame must be positioned vertically. The mechanical zero point setting by means of rotary grip 15 makes it possible to use the stylus with very considerable weight differences, without any change to the coincidence of the tension and signal zero point. The relative position between the stylus and the milling cutter is retained.

Together with the means programmed in the processor for adjusting the stylus deflection and for influencing the milling operating and with the adjustable spring characteristic in the tracer head, the productivity of a copy milling machine with digital copying means can be increased over and beyond what is achievable with known devices.

While the fundamental novel features of the invention have been shown and described and pointed out, it will be understood that various substitutions and changes in the form of the details of the embodiments shown may be made by those skilled in the art without departing from the concepts of the invention as limited only by the scope of the claims which follow.

What is claimed is:

1. A method of digitally controlling a tool of a copy milling machine wherein a model is scanned by a stylus mechanically mounted in a tracer head to contact a model surface, the stylus being deflected both at right angles and tangentially to the surface of the model when the stylus contacts the model to produce scanning signals which are proportional to the deflections at right angles to the model surface and to the deflections tangential to the model surface, said signals then being transmitted to a processor which processes, amplifies and subsequently feeds the processed and amplified scanning signals to servomotors of the machine to cut and shape a workpiece in such manner as to produce a copy of the model, the method comprising the steps of positioning the stylus initially within the tracer head at a central zero position along each of three axes of coordinates, establishing a nominal deflection of the stylus with respect to its centered zero-position, the amount of deflection at right angles to the model surface being varied and adjusted by the processor depending on a stylus feed rate, and on a path of the tracer guided over the model, in such a way as to compensate for variable deflections of the cutter, as they occur in the course of the cutting process and which, without this compensation, would cause dimensional errors of the machined workpiece, and additionally repositioning the stylus to a preselected non zero position along each of the axes, the position along each of the axes being selected individually and being variable in time.

2. The method of claim 1, wherein the repositioning step is used to set the amount of deflection of the stylus along perpendicular and tangential directions with respect to the model surface.

3. The method of claim 1, wherein the nominal deflection value of the stylus perpendicular to the model surface can be preselected, the value for the radial deflection of the stylus and for its axial deflection being independent from each other.

4. The method of claim 3, wherein the cutter path is broken up into individual sections, each section lying in a plane that is parallel to the cutter axis, the sections being arranged such as to form an uninterrupted sequence and to allow the cutter to interact with the workpiece in the same manner in all places.

5. A tracer head for a copy milling machine comprising:
    a bearing body;
    a stylus secured within the body; and
    first, second and third contact pressure adjusting means acting on said body, each of said means exerting an individually preset pressure along a different corresponding one of the three mutually orthogonal x, y and z axes, wherein each of the pressure adjusting means includes a frame with two legs connected by a web and two oppositely acting springs being supported on the legs, each means also including rocking levers supporting the body and pressed upon the springs, one of said levers providing displaceable support.

6. The tracer head of claim 5, wherein one of the springs has means for manually adjusting the bias thereof.

* * * * *